US007233465B2

(12) United States Patent
Lee

(10) Patent No.: US 7,233,465 B2
(45) Date of Patent: Jun. 19, 2007

(54) GROUND FAULT DETECTION SYSTEM AND METHOD FOR INVERTER

(75) Inventor: Jeoung-Pyo Lee, Gyeonggi-Do (KR)

(73) Assignee: LG Industrial Systems Co., Ltd., Seoul (KR)

( * ) Notice: Subject to any disclaimer, the term of this patent is extended or adjusted under 35 U.S.C. 154(b) by 316 days.

(21) Appl. No.: 10/978,428

(22) Filed: Nov. 2, 2004

(65) Prior Publication Data

US 2005/0099743 A1 May 12, 2005

(30) Foreign Application Priority Data

Nov. 11, 2003 (KR) ...................... 10-2003-0079547

(51) Int. Cl.
*H02H 9/08* (2006.01)

(52) U.S. Cl. ........................................................ 361/42

(58) Field of Classification Search ................... 361/42
See application file for complete search history.

(56) References Cited

U.S. PATENT DOCUMENTS 5,214,575 A * 5/1993 Sugishima et al. ........... 363/37
5,483,167 A * 1/1996 Mikami ...................... 324/510
5,768,079 A * 6/1998 Buell .......................... 361/78
6,646,842 B2 * 11/2003 Pan et al. ..................... 361/58
6,977,478 B2 * 12/2005 Biamonte et al. ........... 318/824
2004/0075471 A1 4/2004 Lee et al.

FOREIGN PATENT DOCUMENTS

WO WO 2004/004420 * 1/2004

* cited by examiner

*Primary Examiner*—Stephen W. Jackson
*Assistant Examiner*—Scott Bauer
(74) *Attorney, Agent, or Firm*—Greenblum & Bernstein, P.L.C.

(57) ABSTRACT

The present invention discloses a ground fault detection system and method for an inverter. The ground fault detection method for the inverter includes a reference value setting step for setting a reference value for estimating a ground fault current and a reference value for deciding a ground fault, a ground fault current estimation step for comparing a current value obtained by adding up current values flowing through each phase of an output terminal of the inverter with the reference value for estimating the ground fault current, and estimating generation of the ground fault current when the calculated current value is larger than the reference value, and a ground fault phase decision step for deciding the phase in which the ground fault has been generated on the basis of a current difference value between start and end points of 0 vector sections of each phase or between start and end points of 7 vector sections of each phase. Therefore, even if the ground fault occurs in an output line during the load operation or a power frequency of the inverter is similar to an output frequency, the ground fault detection system and method for the inverter detect the ground fault to improve operational reliability of the inverter.

18 Claims, 5 Drawing Sheets

GROUND FAULT DETECTION SYSTEM AND METHOD FOR INVERTER

BACKGROUND OF THE INVENTION

1. Field of the Invention

The present invention relates to a ground fault detection system, and more particularly to, a ground fault detection system and method for an inverter which can detect a ground fault generated between an output terminal of the inverter and the earth, and discriminate the phase in which the ground fault has been generated.

2. Description of the Background Art

In general, an inverter is a driving apparatus for a variable speed motor which can efficiently control a speed and torque of the motor, by receiving power from a utility power supply, converting the power into a DC, converting the DC into a variable voltage variable frequency AC, and supplying the AC to the motor. The inverter reduces energy consumption and improves quality by precisely controlling the speed of the motor. Therefore, the inverter has been widely used for automatic facilities such as various air blowers, pumps, machine tools and fiber tools.

On the other hand, distribution line systems using the inverter perform grounding to prevent overcurrent damages from occurring by fault contacts of high and low voltages. For example, in order to prevent overcurrent, a neutral point is grounded in 3-phase Y connection, and one of RST phases is used as a ground in 3-phase Δ connection. However, if an output line of the inverter contacts the earth due to lightening or aging, a large amount of current flows through the earth via a rectifier diode and a switching element of the inverter, which causes secondary accidents such as element damages and fire. Accordingly, a protection system for handling a ground fault generated between the output terminal of the inverter and the earth is required to form the control system using the inverter.

FIG. 1 is an exemplary diagram illustrating an equivalent circuit in a state where a ground fault has been generated in driving an AC motor.

Referring to FIG. 1, in a conventional system for receiving per from an AC power supply 1 and driving an AC motor 5 through an inverter, when R phase of RST phases is used as a ground, if U phase outputted from the inverter contacts the earth to cause a ground fault, a leakage current iG flows through a ground resistor 6. The leakage current iG influences the system through various paths, such as a switching element 4, a rectifier diode 2, a filter condenser 3 for smoothing a DC voltage, and the AC motor 5.

FIG. 2 is a block diagram illustrating a conventional ground fault detection system for detecting and overcoming a ground fault.

As illustrated in FIG. 2, the conventional ground fault detection system includes a (V/f PWM) inverter 9 for converting a DC into an AC and outputting the AC, a current detector 10 for detecting currents flowing through U, V W phases of an output terminal of the inverter 9, a main controller 7 for calculating a ground fault current on the basis of the currents detected by the current detector 10, and determining a failure or a continuous operation, and a variable voltage/variable frequency PWM controller 8 for embodying switching patterns for driving the inverter 9.

A conventional ground fault detection method will now be described.

FIG. 3 is a flowchart showing sequential steps of the conventional ground fault detection method.

As shown in FIG. 3, the main controller 7 sets a ground fault current level as a reference value for estimating a ground fault, and also sets a ground fault counter value as a reference value for deciding the ground fault (ST10).

When the inverter 9 starts outputting, the current detector 10 detects the currents of each phase flowing through the output terminal of the inverter 9 (ST11). The main controller 7 compares a current value obtained by adding up the currents of each phase flowing through the output terminal of the inverter 9 with the set ground fault current level (ST13). If the calculated ground fault current is greater than the set ground fault current level, the main controller 7 increases an inside counter (ST14).

Finally, if the added counter value is larger than a preset ground fault counter value, the main controller 7 processes the ground fault (ST15 and ST16).

FIG. 4 is a waveform diagram illustrating a general ground fault detection result.

As depicted in FIG. 4, channel 1 indicates a U phase current, and channel 2 indicates a ground fault current. Here, the experiment has been made by equalizing a frequency of an AC power supply to an output frequency of an inverter, and operating the inverter. That is, although the phase current is seriously distorted due to an external ground fault and a large amount of ground fault current flows, the conventional ground fault detection method cannot always handle the ground fault.

As a result, in the conventional ground fault detection system, in case the ground fault is generated after power supply and the ground fault current flows over an overcurrent trip, the system can be protected by an overcurrent protection circuit. However, if the ground fault current does not reach the overcurrent level, the motor is damaged. In addition, when the power frequency of the inverter is similar to the output frequency, the ground fault is not detected. Accordingly, in the conventional ground fault detection system, the ground fault current flows through the earth via the rectifier diode and the switching element of the inverter, which causes secondary accidents such as element damages and fire and reduces reliability of the product. As input voltages of an induction motor overlap with each other, torque unbalance is generated and properties of a predetermined speed of the AC motor are deteriorated.

SUMMARY OF THE INVENTION

Therefore, an object of the present invention is to provide a ground fault detection system and method for an inverter which can improve operational reliability of the inverter and prevent secondary accidents such as element damages and fire, by detecting the ground fault when the ground fault is generated in an output line during the load operation or a power frequency of the inverter is similar to an output frequency.

To achieve these and other advantages and in accordance with the purpose of the present invention, as embodied and broadly described herein, there is provided a ground fault detection system for an inverter, including: a current detector for detecting and outputting currents of each phase flowing through an output terminal of the inverter; and a ground fault detector for estimating a ground fault current on the basis of the current information of each phase detected by the current detector, and discriminating the phase in which the ground fault has been generated by inducing phase transition.

According to another aspect of the present invention, a ground fault detection method for an inverter includes: a reference value setting step for setting a reference value for estimating a ground fault current and a reference value for deciding a ground fault; a ground fault current estimation step for comparing a current value obtained by adding up current values flowing through each phase of an output terminal of the inverter with the reference value for estimating the ground fault current, and estimating generation of the ground fault current when the calculated current value is larger than the reference value; and a ground fault phase decision step for deciding the phase in which the ground fault has been generated on the basis of a current difference value between start and end points of 0 vector sections of each phase or between start and end points of 7 vector sections of each phase.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
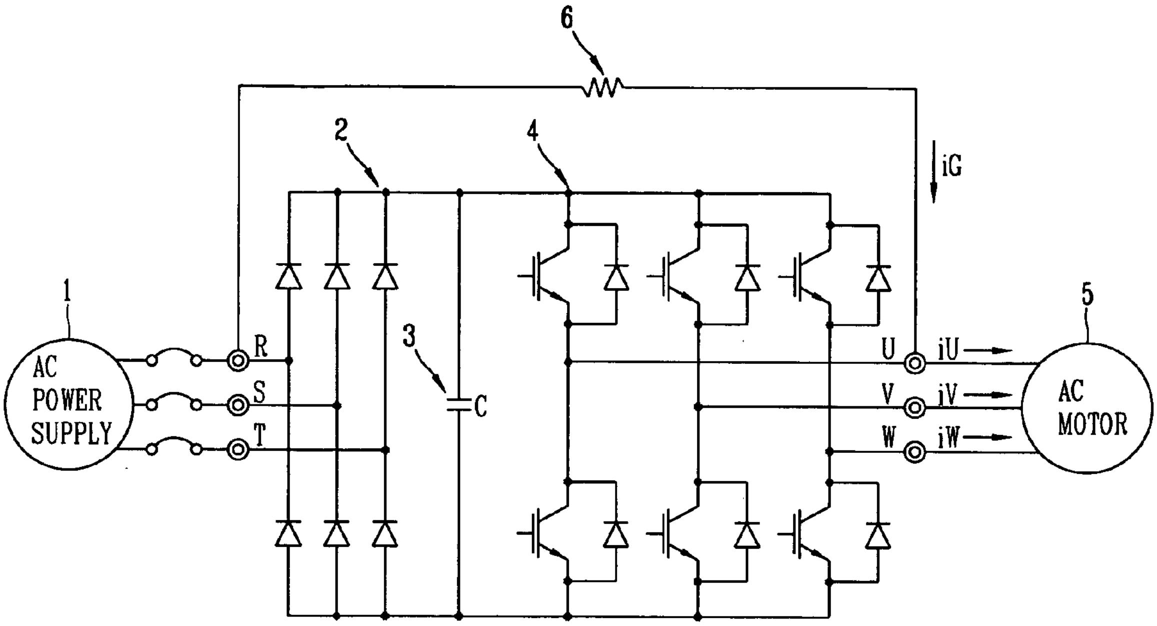
FIG. 1 is an exemplary diagram illustrating an equivalent circuit in a state where a ground fault has been generated in driving a general AC motor.
Figure 2:
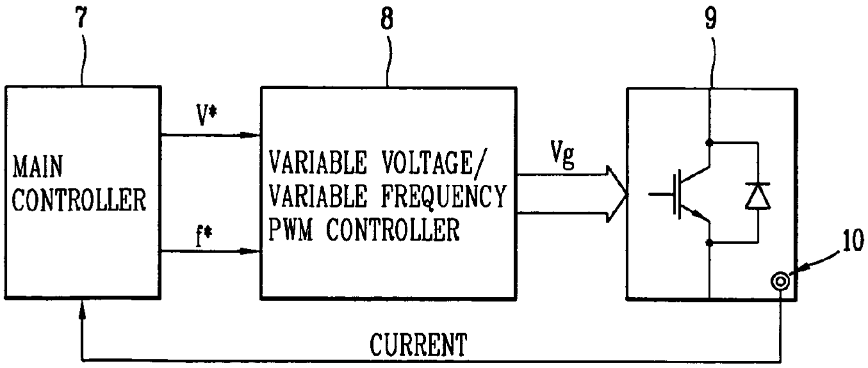
FIG. 2 is a block diagram illustrating a conventional ground fault detection system for detecting and overcoming a ground fault.
Figure 3:
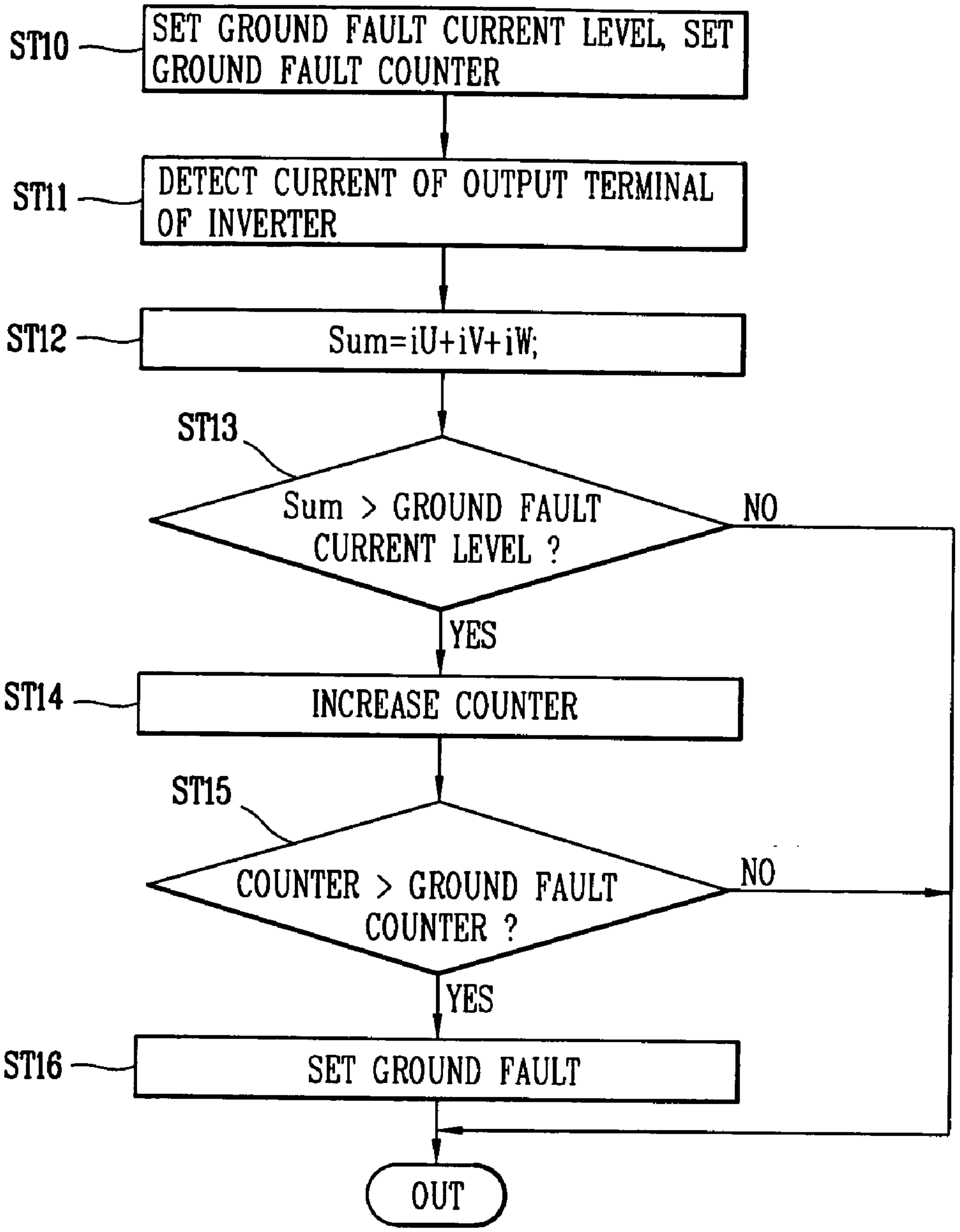
FIG. 3 is a flowchart showing sequential steps of a conventional ground fault detection method.
Figure 4:
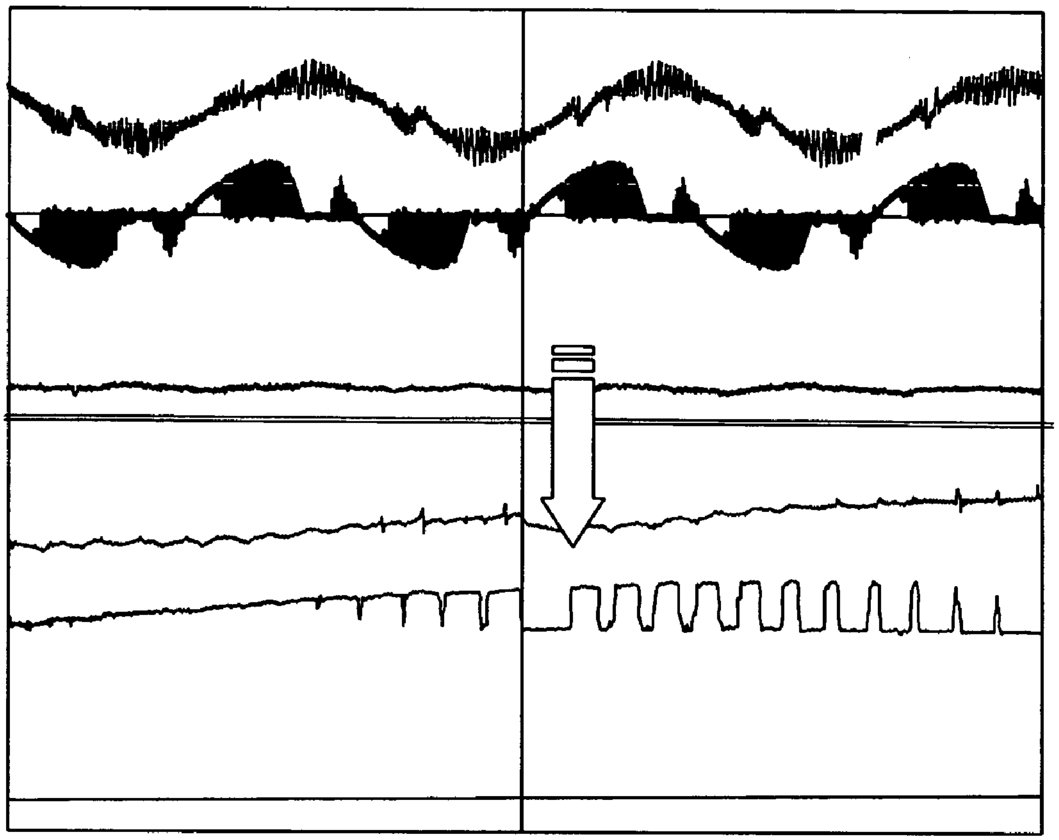
FIG. 4 is a waveform diagram illustrating a general ground fault detection result.
Figure 5:
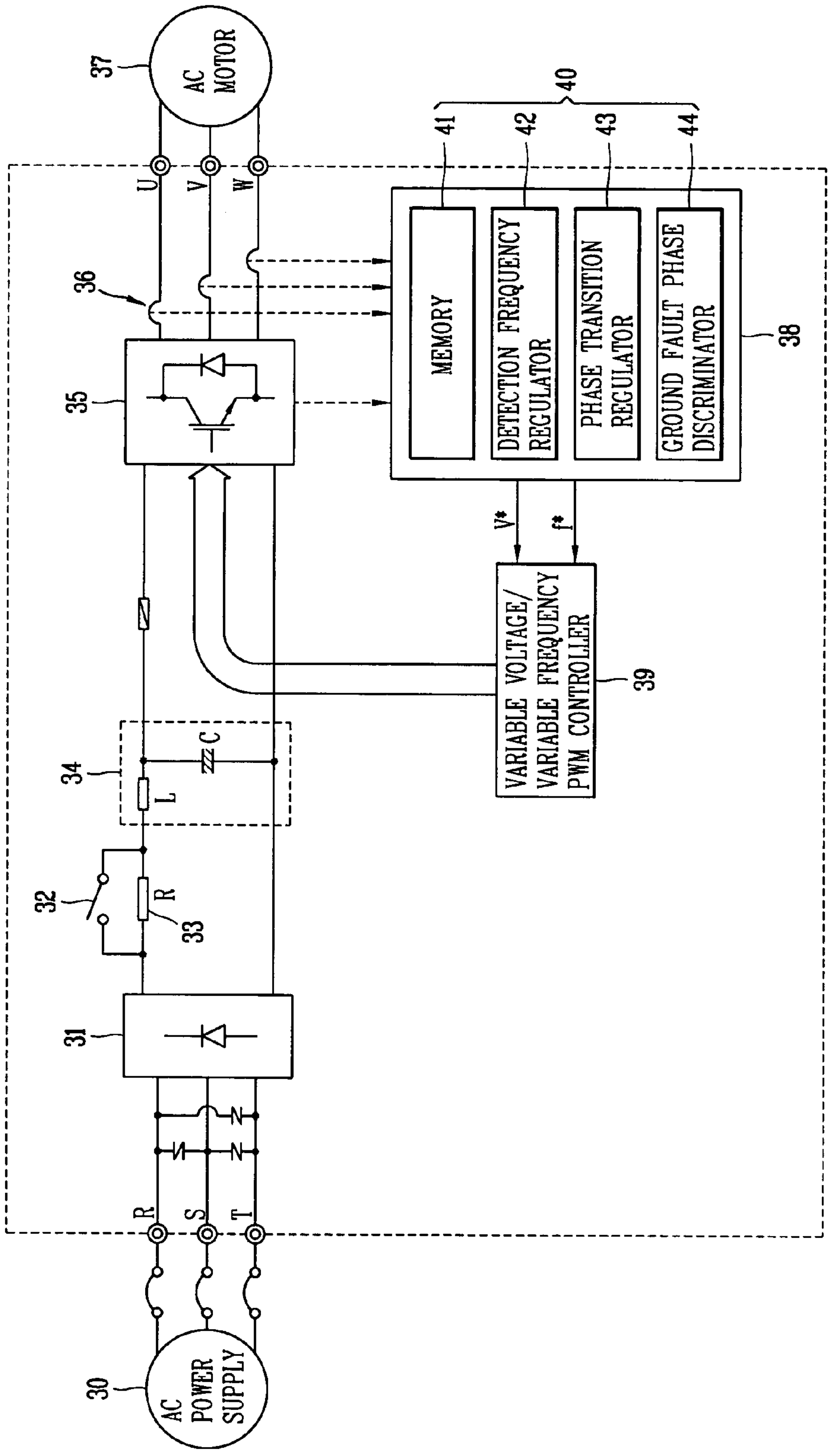
FIG. 5 is a structure diagram illustrating a ground fault detection system for an inverter in accordance with the present invention.

FIG. 5 is a structure diagram illustrating a ground fault detection system for an inverter in accordance with the present invention.

Referring to FIG. 5, the ground fault detection system for the inverter includes a converter 31 for converting an AC into a DC and outputting the DC, an initial charging resistor (R) 33 for preventing inflow of an inrush current in power supply, an electromagnetic contactor 32 for separating the initial charging resistor 33 from the circuit after the inrush current is restricted, a filter condenser 34 for smoothing the DC from the converter 31, a variable voltage/variable frequency PWM inverter 35 (hereinafter, referred to as 'inverter') including a control switching element (for example, transistor, MOSFET, IGBT, GTO, etc.), converting the DC into the AC, and outputting the AC, an AC motor 37 operated by the inverter 35, a current detector 36 for detecting currents iU, iV and iW flowing through U, V and W phases of an output terminal of the inverter 35, a main controller 38 for outputting a voltage command value V* and a frequency command value f* on the basis of various information such as the DC voltage and phase current of the inverter 35, and a variable voltage/variable frequency PWM controller 39 for generating PWM waveforms on the basis of the voltage command value V* and the frequency command value f* from the main controller 38, and applying switching voltages to switching elements of each phase of the inverter 35. Here, the main controller 38 includes a ground fault detector 40 for estimating a ground fault current on the basis of the current information of each phase flowing through the output terminal of the inverter 35, and discriminating the phase in which the ground fault current has been generated by inducing phase transition.

The ground fault detector 40 includes a memory 41 for storing a zero vector band (ZVB) showing a size difference of the currents of each phase in application of 0 vector and 7 vector voltages of each phase, a detection frequency regulator 42 for regulating a current detection interrupt frequency to receive more current information, a phase transition regulator 43 for equalizing a phase of a voltage reference value of each phase with a phase of a current reference value, and a ground fault phase discriminator 44 for calculating a current difference value in application of 0 vector and 7 vector voltages of each phase, and discriminating the phase in which the ground fault current has been generated according to the current difference value and the size of the ZVB.

The operation of the ground fault detection system for the inverter in accordance with the present invention will now be described with reference to FIG. 6.

Figure 6:
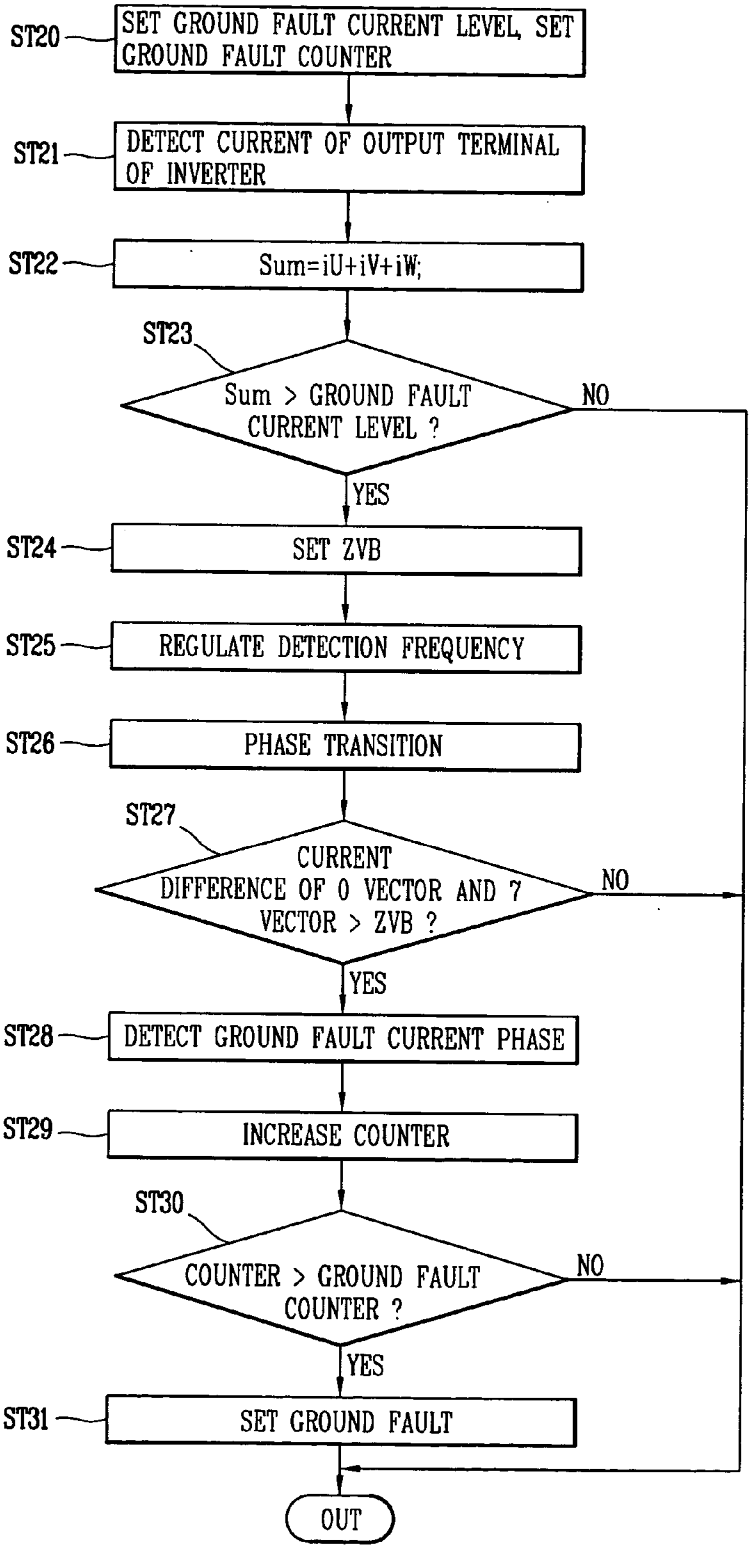
FIG. 6 is a flowchart showing sequential steps of a ground fault detection method for an inverter in accordance with the present invention.

FIG. 6 is a flowchart showing sequential steps of a ground fault detection method for an inverter in accordance with the present invention.

First, the main controller 38 sets, in the memory 41, a ground fault current level which is a reference value for estimating a ground fault, and a ground fault counter value which is a reference value for deciding the ground fault when the ground fault estimation operations are generated over a predetermined number (ST20).

The current detector 36 detects the currents iU, iV and iW of each phase flowing through the output terminal of the inverter 35 in the load operation by the operation of the inverter 35 (ST21).

The main controller 38 compares the ground fault current level with the sum of the current values of each phase detected by the current detector 36, and starts ground fault detection when the calculated ground fault current is greater than the ground fault current level (ST23). That is, when the sum of the currents of each phase of the output terminal of the inverter 35 is zero, the main controller 38 decides that the inverter 35 has been normally operated. However, if the sum of the currents of each phase has a predetermined value, the main controller 38 estimates that the ground fault current (or leakage current) has been generated, and performs the operation for deciding the phase in which the ground fault current (or leakage current) has been generated.

That is, when the ground fault detection is determined, the ground fault detector 40 sets the ZVB which is a reference value for the size difference of the currents of each phase in application of 0 vector and 7 vector voltages (ST24), and increases current information by adjusting the detection frequency of the currents of each phase (ST25). In addition, the phase transition regulator 43 equalizes the phase of the voltage reference value to the phase of the current reference value (ST26).

The ground fault phase discriminator 44 compares a current difference value between start and end points of 0 vector sections of each phase and start and end points of 7 vector sections of each phase with the ZVB, thereby deciding the phase in which the ground fault current has been generated (ST27 and ST28).

In more detail, the voltage vectors outputted from the inverter 35 can be divided into eight type voltage vectors V0 to V7. That is, the voltage vectors can be displayed as effective vectors V1 to V6 and voltage vectors V0 and V7 having a line voltage of '0'. Here, if the phase having a gradient for the current value in the start and end points of 0 vector sections of each phase or the start and end points of 7 vector sections of each phase is detected, the phase is deemed to be the phase through which the ground fault current flows. Therefore, it is recognized that the ground fault current flows through the phase having the increased gradient among the output phases of the inverter 35.

When the phase through which the ground fault current flows is decided, the main controller 38 increases the counter (ST29). The increased counter value is compared with the ground fault counter value set in the main controller 38 (ST30). If the counter value (namely, the ground fault detection operation) is over a predetermined number, generation of the ground fault is decided, and driving of the AC motor 37 is stopped (ST31).

In accordance with the present invention, the ground fault detection method for the inverter estimates the ground fault current, decides the phase in which the ground fault has been generated, and compares the counter value with the preset ground fault counter value, thereby confirming generation of the ground fault.

As discussed earlier, the ground fault detection system and method for the inverter decide the phase through which the ground fault current flows among the phases of the output terminal of the inverter, by equalizing the phase of the output voltage to the phase of the current, and detect the ground fault. Therefore, even if the ground fault occurs in the output line during the load operation or the power frequency of the inverter is similar to the output frequency, the ground fault detection system and method for the inverter detect the ground fault to improve operational reliability of the inverter. Furthermore, the ground fault detection system and method for the inverter can prevent secondary accidents such as element damages and fire from occurring due to non-detection of the ground fault.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A ground fault detection method for an inverter, comprising:

setting a reference value for detecting a ground fault;

comparing a current value calculated by summing current values of each of a plurality of phase currents flowing through an output terminal of the inverter with the reference value for detecting the ground fault;

determining that a ground fault exists when the calculated current value is larger than the reference value;

determining a phase in which the ground fault exists on the basis of a current difference value between start and end points of 0 vector sections of each phase or between start and end points of 7 vector sections of each phase;

setting a zero vector band which is a reference value for a size difference of each of the plurality of phase currents in application of 0 voltage vector and 7 voltage vector;

increasing current information by adjusting a detection frequency of each of the plurality of phase currents; and equalizing a phase of a voltage reference value to a phase of a current reference value.

2. The method of claim 1, further comprising determining that the inverter is operating normally when the sum of the current values is zero.

3. The method of claim 1, wherein the phase in which the ground fault exists is determined by comparing the current difference value between the start and end points of 0 vector sections of each phase and the start and end points of 7 vector sections of each phase with the zero vector band.

4. The method of claim 1, further comprising determining that a phase having an increased gradient for the current value in the start and end points of 0 vector sections of each phase or the start and end points of 7 vector sections of each phase as the phase in which the ground fault exists.

5. The method of claim 1, further comprising storing, in a memory, a ground fault current level which is a reference value for estimating a ground fault current, and a ground fault counter value which is a reference value for detecting a ground fault when the ground fault estimation operations are generated over a predetermined number.

6. The method of claim 1, further comprising:

increasing a counter by determining the phase in which the ground fault current exists;

comparing the increased counter value with a ground fault counter value; and when the counter value is over a predetermined number, determining that a ground fault exists.

7. A ground fault detection method for an inverter, comprising:

when a current value calculated by summing current values of each of a plurality of phase currents flowing through the inverter is greater than a ground fault current level, determining that a ground fault exists;

in accordance with determining that the ground fault exists, setting a zero vector band which is a reference value for a size difference of the each of the plurality of phase currents in application of 0 voltage vector and 7 voltage vector;

increasing current information by adjusting a detection frequency of the currents of each phase;

equalizing a phase of a voltage reference value to a phase of a current;

determining a phase in which the ground fault exists by comparing a current difference value in application of 0 vector and 7 vector of each phase with a size of the zero vector band; and when ground fault detection is performed over a predetermined number, determining the ground fault.

8. The method of claim 7, wherein the phase in which the ground fault exists is determined by comparing a current difference value between the start and end points of 0 vector sections of each phase and the start and end points of 7 vector sections of each phase with the zero vector band.

9. The method of claim 7, wherein a phase having an increased gradient for the current value in the start and end points of 0 vector sections of each phase or the start and end points of 7 vector sections of each phase is determined to be the phase in which the ground fault exists.

10. A ground fault detection system for an inverter, comprising:

a current detector that detects and outputs a current value of each of a plurality of phase currents flowing through an output terminal of the inverter; and a ground fault detector that detects a ground fault on the basis of the current values detected by the current detector, and determines a phase in which the ground fault exists by inducing a phase transition, the ground fault detector comprising a detection frequency regulator that regulates a current detection interrupt frequency to receive current information.

11. The system of claim 10, wherein the ground fault detector comprises:

a memory that stores a zero vector band which is a reference value for a size difference of each of the plurality of currents of each phase in application of 0 vector and 7 vector voltages;

a phase transition regulator that equalizes a phase of a voltage reference value of each of the plurality of phase currents with a phase of a current reference value; and a ground fault phase discriminator that calculates a current difference value in application of 0 vector and 7 vector voltages of each phase, and determines the phase in which the ground fault exists according to the current difference value and the a size of the zero vector band.

12. The system of claim 11, wherein the ground fault phase discriminator determines the phase in which the ground fault exists by comparing the current difference value between start and end points of 0 vector sections of each phase and start and end points of 7 vector sections of each phase with the zero vector band.

13. The system of claim 10, wherein the memory further comprises a ground fault current level which is a reference value for detecting a ground fault, and a ground fault counter value which is a reference value for detecting the ground fault when ground fault detection operations are generated over a predetermined number.

14. The system of claim 10, wherein a current value calculated by summing the detected current values is compared with a ground fault current level, and when the calculated current value is greater than the ground fault current level, it is determined that a ground fault exists.

15. The system of claim 10, wherein the ground fault detector determines that a phase having a gradient for the current value in the start and end points of 0 vector sections of each phase or the start and end points of 7 vector sections of each phase as the phase in which the ground fault exists.

16. The system of claim 10, wherein the ground fault detector determines that a phase having an increased gradient for the current value in the start and end points of 0 vector sections of each phase or the start and end points of 7 vector sections of each phase as the phase in which the ground fault exists.

17. The system of claim 10, further comprising:

a converter that converts an alternating current into a direct current and outputs the direct current;

an initial charging resistor that prevents inflow of an inrush current in a power supply;

an electromagnetic contactor that separates the initial charging resistor from the circuit after the inrush current is restricted;

a filter condenser that smoothes the direct current from the converter; and an inverter including a control switching element, that converts the direct current into an alternating current, and outputs the converted alternating current.

18. The system of claim 17, wherein the control switching element comprises one of a transistor, a MOSFET, an IGBT and a GTO.

* * * * *

UNITED STATES PATENT AND TRADEMARK OFFICE

CERTIFICATE OF CORRECTION

PATENT NO. : 7,233,465 B2
APPLICATION NO. : 10/978428
DATED : June 19, 2007
INVENTOR(S) : J. P. Lee It is certified that error appears in the above-identified patent and that said Letters Patent is hereby corrected as shown below:

At column 7, line 31 (claim 11, line 14) of the printed patent, after "value and" delete "the".

Signed and Sealed this

Twenty-seventh Day of May, 2008

JON W. DUDAS
*Director of the United States Patent and Trademark Office*